United States Patent
Zhang et al.

(10) Patent No.: US 11,006,406 B2
(45) Date of Patent: May 11, 2021

(54) DISCOVERY REFERENCE SIGNAL OCCASION CONFIGURATION

(71) Applicant: Microsoft Technology Licensing, LLC, Redmond, WA (US)

(72) Inventors: Yuantao Zhang, Beijing (CN); Haitao Li, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 23 days.

(21) Appl. No.: 14/503,328

(22) Filed: Sep. 30, 2014

(65) Prior Publication Data

US 2016/0037513 A1 Feb. 4, 2016

(30) Foreign Application Priority Data

Jul. 31, 2014 (CN) .......................... 201410370863.8

(51) Int. Cl.
*H04W 72/04* (2009.01)
*H04L 5/00* (2006.01)
(Continued)

(52) U.S. Cl.
CPC ......... *H04W 72/0446* (2013.01); *H04L 5/005* (2013.01); *H04L 5/0094* (2013.01);
(Continued)

(58) Field of Classification Search
CPC ........... H04W 72/0493; H04W 72/042; H04W 72/0426; H04W 72/0433; H04W 72/0446;
(Continued)

(56) References Cited

U.S. PATENT DOCUMENTS 9,131,513 B2 * 9/2015 Cai .................. H04W 72/0433
2012/0213109 A1 8/2012 Xu et al.
(Continued)

FOREIGN PATENT DOCUMENTS

CN 103460634 A 12/2013
WO 2014073865 A1 5/2014

OTHER PUBLICATIONS

"International Search Report & Written Opinion for PCT Patent Application No. PCT/US2015/042779", dated Oct. 12, 2015, Filed Date: Jul. 30, 2015, 15 Pages.
(Continued)

*Primary Examiner* — Joshua Kading
(74) *Attorney, Agent, or Firm* — Ray Quinney & Nebeker PC; Thomas M. Hardman; Qudus Olaniran

(57) ABSTRACT

This disclosure generally relates to a discovery reference signal occasion configuration. In one embodiment, a time period for transmission of a discovery reference signal may be obtained, which comprises a plurality of consecutive subframes. Furthermore, at least one first subframe of the time period may be configured for transmission of discovery reference signals from activated small cells, and at least one second subframe of the time period may be configured for transmission of discovery reference signals from deactivated small cells, wherein the at least one second subframe is different from the at least one first subframe. In this way, the activated small cells and the deactivated small cells may transmit discovery reference signals in different subframes within the discovery reference signal occasion such that the interferences of transmission of discovery reference signals may be significantly reduced.

20 Claims, 5 Drawing Sheets

(51) Int. Cl.
*H04W 48/16* (2009.01)
*H04W 52/02* (2009.01)
*H04W 16/16* (2009.01)
*H04W 56/00* (2009.01)
*H04W 48/08* (2009.01)
H04W 28/08 (2009.01)
H04W 84/10 (2009.01)

(52) U.S. Cl.
CPC .......... *H04W 16/16* (2013.01); *H04W 48/08* (2013.01); *H04W 48/16* (2013.01); *H04W 52/02* (2013.01); *H04W 56/0015* (2013.01); H04W 28/08 (2013.01); H04W 84/105 (2013.01)

(58) Field of Classification Search
CPC ..... H04W 48/08; H04W 48/16; H04W 8/005; H04W 40/24; H04W 40/246; H04L 5/005; H04L 5/0094
See application file for complete search history.

(56) References Cited

U.S. PATENT DOCUMENTS

| | | | |
|---|---|---|---|
| 2013/0039199 A1 | 2/2013 | Liao et al. | |
| 2013/0077507 A1 | 3/2013 | Yu et al. | |
| 2013/0279362 A1 | 10/2013 | Park et al. | |
| 2014/0094162 A1 | 4/2014 | Heo et al. | |
| 2014/0133395 A1 | 5/2014 | Nam et al. | |
| 2014/0198675 A1 | 7/2014 | He et al. | |
| 2015/0049649 A1* | 2/2015 | Zhu | H04L 5/0092 370/277 |
| 2015/0189574 A1* | 7/2015 | Ng | H04W 24/08 370/252 |
| 2015/0312789 A1* | 10/2015 | You | H04L 5/0007 370/252 |
| 2016/0219475 A1* | 7/2016 | Kim | H04W 76/025 |
| 2016/0295500 A1* | 10/2016 | Liu | H04W 48/16 |
| 2017/0048918 A1* | 2/2017 | Iwamura | H04W 52/0206 |

OTHER PUBLICATIONS

CMCC, "Discussion on air-interface based synchronization for small cell enhancement", 3GPP TSG RAN WG1 Meeting #73, Fukuoka, Japan, May 20-24, 2013.
Huawei et al., Network assistance for small cell discovery, 3GPP TSG RAN WG1 Meeting #76bis, Shenzen, China, Mar. 31-Apr. 4, 2014.
"Status Report to TSG 1 Work plan related evaluation", 3GPP Draft; RP-140635, 3rd Generation Partnership Project (3GPP), Jun. 6, 2014.
Chang, Prof. Kyunghi., "3GPP LTE-Advanced Technologies", Jul. 16, 2014 Available at: http://academy.itu.int/moodle/pluginfile.php/71164/mod_label/intro/Session%206.%20LTE-Advanced%20Technologies.pdf.
Temon, et al., "Energy Savings in Heterogeneous Networks with Clustered Small Cell Deployments", Jul. 16, 2014 Available at: https://www.metis2020.com/wp-content/uploads/publications/ISWCS_2014_Temon_etal_EnergySavingsInHeterogeneousNetworks.pdf.
"First Office Action and Search Report issued in Chinese Patent Application No. 201580041003.2", dated Sep. 10, 2019, 15 Pages.
"Second Office Action Issued in Chinese Patent Application No. 201580041003.2", dated Feb. 25, 2020, 7 Pages.

* cited by examiner

DISCOVERY REFERENCE SIGNAL OCCASION CONFIGURATION

RELATED APPLICATIONS

This application claims priority to Chinese Application No. 201410370863.8, filed on Jul. 31, 2014, and entitled "DISCOVERY REFERENCE SIGNAL OCCASION CONFIGURATION." This application claims the benefit of the above-identified application, and the disclosure of the above-identified application is hereby incorporated by reference in its entirety as if set forth herein in full.

BACKGROUND

In a wireless communication system, a plurality of small cells may be deployed in a blind point or hot point within a macro cell so as to improve system coverage and capacity. As used herein, the term "blind point" refers to a hole of the coverage of the macro cell where no service is able to be provided to user equipment (UE) due to obstacles. The term "the hot point" refers to an area where there are too many traffic needs. Such a small cell may comprise a femtocell, a picocell, a microcell and the like. In some scenarios, within a macro cell already comprising a plurality of small cells, there may be also a plurality of transmission points (TPs), such as remote radio heads (RRHs). The TPs may be radio units that are physically separated from a based station (BS) of the macro cell, but considered as parts of the BS. By means of the TPs, the system coverage and capacity may be further improved.

For the purpose of load balancing, power saving and the like, a UE may need to discover small cells or TPs surrounding it and report the discovery results to the BS of the macro cell such that the BS may decide which small cell or TP will be turned on and/or turned off Typically, during the procedure of the discovery, a UE detects a Primary Synchronization Signal/Second Synchronization Signal (PSS/SSS), which is used as a typical discovery reference signal, from a small cell or TP, obtains information related to the small cell or TP from the PSS/SSS, and reports the information to the BS of the macro cell. As used herein, the term "discovery reference signal" refers to a reference signal for the discovery of a small cell or a TP. The discovery reference signal may include, but be not limited to, a PSS/SSS, a common reference signal (CRS), and/or a channel state information reference signal (CSI-RS).

SUMMARY

In the third Generation Partnership Project (3GPP) Technical Standardization Group (TSG) Radio Access Network 1 (RAN1) meeting, a discovery reference signal (DRS) occasion is proposed as a time period for transmission of a discovery reference signal in a Long Term Evolution (LTE) system, which comprises N (N<=5) consecutive subframes. One subframe within the occasion is specified for transmitting a PSS/SSS for a specific small cell or TP. If all PSS/SSSs from different small cells and TPs are transmitted in the same subframe, significant interferences may be caused. The interferences may in turn degrade the reception of the discovery reference signal and/or measurement related to the discovery reference signal.

In accordance with one aspect of the subject matter described herein, a BS of a macro cell may obtain a time period for transmission of a discovery reference signal, which comprises a plurality of consecutive subframes. Then, the BS of the macro cell may configure at least one first subframe of the occasion for transmission of discovery reference signals from activated small cells and configure at least one second subframe of the occasion for transmission of discovery reference signals from deactivated small cells, wherein the at least one second subframe is different from the at least one first subframe.

In accordance with this aspect of the subject matter described herein, a BS of a small cell may obtain the time period for transmission of a discovery reference signal. Then, in response to the small cell activated, the BS of the small cell may obtain the at least one first subframe and transmit a discovery reference signal using the at least one first subframe, and, in response to being deactivated, obtain the at least one second subframe and transmit the discovery reference signal using the at least one second subframe.

Still in accordance with this aspect of the subject matter described herein, a UE may obtain the time period for transmission of a discovery reference signal and the at least one first and second subframes. Then, the UE may receive a discovery reference signal in in the at least one first or second subframe.

In this way, the activated small cells and the deactivated small cells may transmit discovery reference signals in different subframes within the DRS occasion such that the interferences of transmission of discovery reference signals may be significantly reduced. Moreover, the UE may thereby be aware of the activated or deactivated state of a small cell upon the reception of the discovery reference signal from the small cell.

Furthermore, as known, the CRS, which uniquely corresponds to identification information of a cell, such as a cell identifier (ID), is typically used for the cell measurement, such as the measurement of the reference signal received power (RSRP). However, for a TP, the UE may not use the CRS to discriminate the TP from other TPs, and accurately measure the RSRP, because a plurality of TPs are generally configured with one cell ID.

In accordance with another aspect of the subject matter described herein, the BS of the macro cell may transmit identification information of a TP to the UE. The UE may determine that a discovery reference signal is received from a TP but not from a small cell based on the identification information. Then, the UE may use the CSI-RS instead of the CRS to obtain a measurement of the RSRP. In this way, the UE may obtain a more accurate measurement of the RSRP for a TP.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

The subject matter described herein will now be discussed with reference to several example embodiments. It should be understood these embodiments are discussed only for the purpose of enabling those skilled persons in the art to better understand and thus implement the subject matter described herein, rather than suggesting any limitations on the scope of the subject matter.

As used herein, the term "base station" (BS) may represent a node B (NodeB or NB), an evolved NodeB (eNodeB or eNB), a low power node such as a femto, a pico, and so forth.

As used herein, the term "transmission point" (TP) refers to any radio unit that is physically separated from a BS, but is considered as a part of the BS. By way of example, the TP may include a Remote Radio Unit (RRU), a radio header (RH), a remote radio head (RRH) and the like.

As used herein, the term "user equipment" (UE) refers to any terminal device that is capable of communicating with the BS. By way of example, the UE may include a Mobile Terminal (MT), a Subscriber Station (SS), a Portable Subscriber Station (PSS), a Mobile Station (MS), or an Access Terminal (AT).

As used herein, the term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Figure 1:
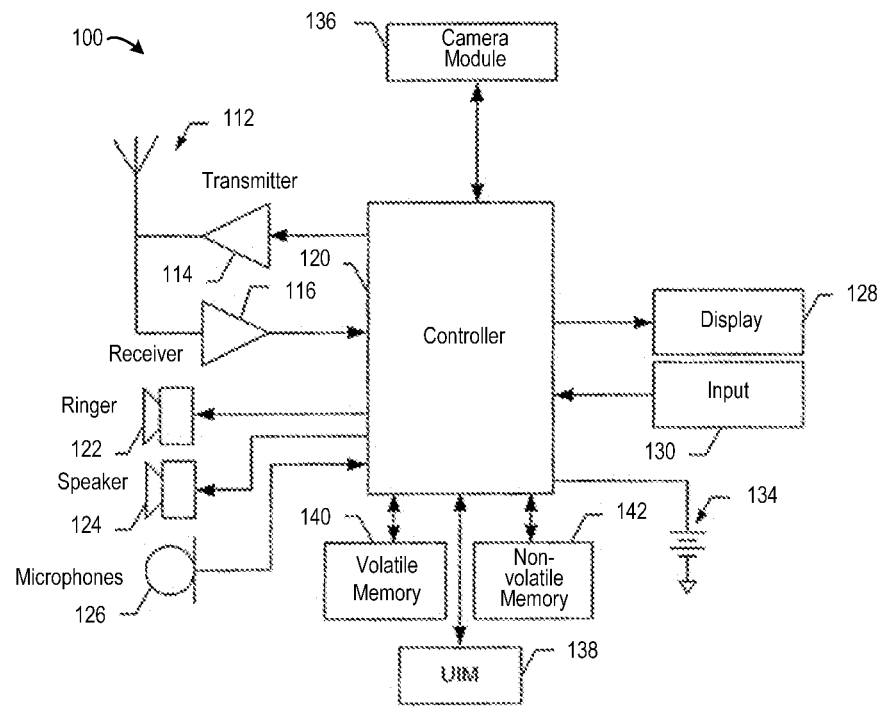
FIG. 1 illustrates a block diagram of a UE in accordance with one embodiment of the subject matter described herein.

FIG. 1 illustrates a block diagram of a UE 100 in accordance with one embodiment of the subject matter described herein. The UE 100 may be a mobile device with a wireless communication capability. However, it is to be understood that any other types of user devices may also easily adopt embodiments of the subject matter described herein, such as a portable digital assistant (PDA), a pager, a mobile computer, a mobile TV, a game apparatus, a laptop, a tablet computer, a camera, a video camera, a GPS device, and other types of voice and textual communication system. A fixed-type device may likewise easily use embodiments of the subject matter described herein.

The UE 100 comprises one or more antennas 112 operable to communicate with the transmitter 114 and the receiver 116. The UE 100 further comprises at least one controller 120. It should be understood that the controller 120 comprises circuits or logic required to implement the functions of the user terminal 100. For example, the controller 120 may comprise a digital signal processor, a microprocessor, an A/D converter, a D/A converter, and/or any other suitable circuits. The control and signal processing functions of the UE 100 are allocated in accordance with respective capabilities of these devices.

The UE 100 may further comprise a user interface, which, for example, may comprise a ringer 122, a speaker 124, a microphone 126, a display 128, and an input interface 130, and all of the above devices are coupled to the controller 120. The UE 100 may further comprise a camera module 136 for capturing static and/or dynamic images.

The UE 100 may further comprise a battery 134, such as a vibrating battery set, for supplying power to various circuits required for operating the user terminal 100 and alternatively providing mechanical vibration as detectable output. In one embodiment, the UE 100 may further comprise a user identification module (UIM) 138. The UIM 138 is usually a memory device with a processor built in. The UIM 138 may for example comprise a subscriber identification module (SIM), a universal integrated circuit card (UICC), a universal user identification module (USIM), or a removable user identification module (R-UIM), etc. The UIM 138 may comprise a card connection detecting apparatus according to embodiments of the subject matter described herein.

The UE 100 further comprises a memory. For example, the user terminal 100 may comprise a volatile memory 140, for example, comprising a volatile random access memory (RAM) in a cache area for temporarily storing data. The UE 100 may further comprise other non-volatile memory 142 which may be embedded and/or movable. The non-volatile memory 142 may additionally or alternatively include for example, EEPROM and flash memory, etc. The memory 140 may store any item in the plurality of information segments and data used by the UE 100 so as to implement the functions of the UE 100. For example, the memory may contain machine-executable instructions which, when executed, cause the controller 120 to implement the method described below.

It should be understood that the structural block diagram in FIG. 1 is shown only for illustration purpose, without suggesting any limitations on the scope of the subject matter described herein. In some cases, some devices may be added or reduced as required.

Figure 2:
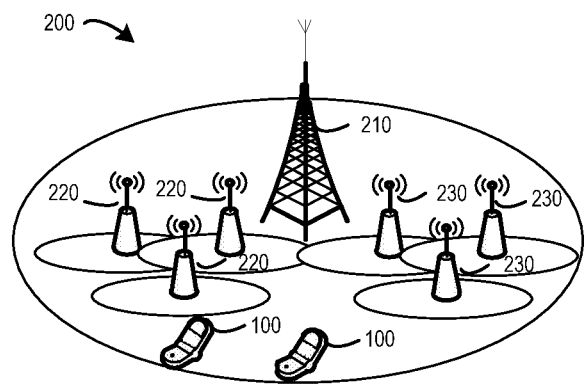
FIG. 2 illustrates a block diagram of an environment in which embodiments of the subject matter described herein may be implemented.

FIG. 2 shows an environment in which embodiments of the subject matter described herein may be implemented. As shown, the system 200 may comprise one macro cell operating in a frequency, such as f1, and several small cells and TPs operating other frequencies, such as f2, within the macro cell. Each of the macro and small cells may have a serving BS. Hereinafter, for the purpose of simplicity, the BS of the macro cell is referred as a macro BS, and the BS of the small cell is referred as a small BS.

As shown in FIG. 2, one or more UEs 100 may communicate with one or more BS 210 of a macro cell, one or more BSs 220 of small cells, and one or more TPs 230 in the system 200. In this example wireless communication system, there are two UEs 100, one macro BS 210, three small BSs 220 and three TPs 230. These are only for the purpose of illustration without suggesting limitations on the numbers of UEs 100, macro BSs 210, small BSs 220 and TPs 230. There may be any suitable number of UEs 100 in communication with any suitable number of macro BSs 210, small BSs 220 and TPs 230 in the system 200.

The communications between the UEs 100 and network nodes, including the macro BSs 210, the small BSs 220 and TPs 230, may be implemented via air interface according to any appropriate communication protocols including, but not limited to, the first generation (1G), the second generation (2G), the third generation (3G), the fourth generation (4G) communication protocols, and/or any other protocols either currently known or to be developed in the future. The communication between one macro BS 210 and one or more small BSs 220 may be implemented in a backhaul link, for example, via an interface between BSs, such as an interface X2. The communication between one macro BS 210 and one or more TPs 230 may be implemented via, for example, a Common Public Radio Interface (CPRI) or an Open Base Station Architecture Initiative (OBSAI) interface.

The UEs 100, BSs 210 and 220 and TPs may use any appropriate wireless communication techniques, including, but not limited to, Code Division Multiple Access (CDMA), Frequency Division Multiple Access (FDMA), Time Division Multiple Address (TDMA), Frequency Division Duplex (FDD), Time Division Duplex (TDD), Multiple Input Multiple Output (MIMO), Orthogonal Frequency Division Multiplexing (OFDM), and/or any other technique either currently known or to be developed in the future.

In the example shown in FIG. 2, only for the purpose of illustration, a small BS 220 may transmit a discovery reference signal to the UE 100 such that the UE 100 may discover the small cell that is provided by the small BS 220. Likewise, a TP 230 may transmit a discovery reference signal for the discovery of the TP 230 to the UE 100.

In the system 200, a DRS occasion, which comprises a plurality of consecutive subframes, is configured, and the UE 100 may receive discovery reference signals from the small cells 220 and/or TPs 230 in the occasion. As discussed above, a DRS occasion has been proposed to transmit a discovery reference signal in the LTE system, wherein one subframe of the occasion is specified for transmitting the PSS/SSS for a specific small cell or TP.

Figure 3:
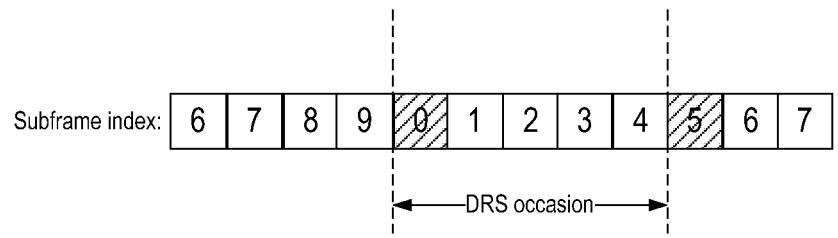
FIG. 3 illustrates an example frame structure of a DRS occasion in a Long Term Evolution (LTE) system in accordance with one embodiment of the subject matter described herein.

FIG. 3 illustrates an example frame structure of a DRS occasion in the LTE system. As shown in FIG. 3, one frame is divided into 10 subframes with indexes of 0 to 9, each subframe having a specified duration, e.g., 1 milliseconds (ms). Subframes 0 and 5 are specified to transmit the PSS/SSS. The example DRS occasion in FIG. 3 comprises 5 consecutive subframes with the indexes of 0 to 4, where subframe 0 is used to transmit the PSS/SSS. That is, all small cells 220 and TPs 230 transmits their PSS/SSSs in subframe 0. However, such concurrent transmission of the references signals from different small cells and/or TPs may cause conflicts and/or interferences among the small cells and/or TPs, and the reception of the discovery reference signals at the UE 100 in turn may be degraded. For the purpose of clarity, some aspects of the subject matter described herein are described below in a context of the LTE system. It is to be understood that this is only for illustration purpose, without suggesting any limitations on the scope of the subject matter described herein.

Figure 4:
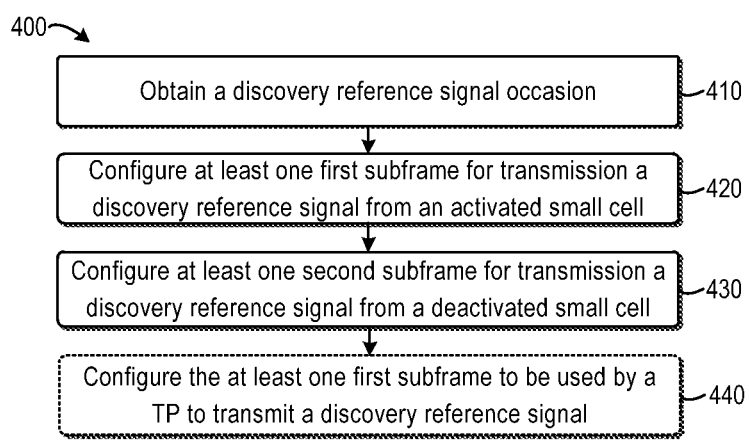
FIG. 4 illustrates a flowchart of a method for configuring a DRS occasion at a macro BS in accordance with one embodiment of the subject matter described herein.

FIG. 4 shows the flowchart of a method 400 for configuring a DRS occasion at a macro BS in accordance with one embodiment of the subject matter described herein. The method 400 may be at least in part implemented by a macro BS 210.

The method 400 is entered at step 410, where the macro BS 210 obtains the DRS occasion comprising a plurality of consecutive subframes. In one embodiment, the DRS occasion may be configured by the macro BS 210. In another embodiment, the configuring may be performed by any other suitable device. For example, the DRS occasion may be configured by a network control element, such as a Radio Network Controller (RNC) (not shown), and then transmitted from the RNC to the macro BS 210. The duration of the occasion, e.g., the number of the subframes in the occasion, and the beginning subframe of the occasion may be set flexibly according to practical needs.

Then, the method 400 proceeds to step 420, where the macro BS 210 configures at least one first subframe of the occasion for transmission of a discovery reference signal from an activated small cell. Next, at step 430, the macro BS 210 configures at least one second subframe of the occasion for transmission of a discovery reference signal from a deactivated small cell, wherein the second subframe is different from the first subframe. Hereinafter, for the purpose of simplicity, the subframe for transmission of a discovery reference signal from an activated small cell is referred as the first subframe, and the subframe for transmission of a discovery reference signal from a deactivated small cell is referred as the second subframe.

According to embodiments of the subject matter described herein, the number of the at least one first or second subframe may be one or more. In this way, the transmission of the discovery reference signals from the small cells may be separated based on the activated (e.g., "on") or deactivated (e.g., "off") states of the small cells such that conflicts and/or interferences may be reduced.

In one embodiment, for the sake of compatibility, the first subframe for transmission of a discovery reference signal from an activated small cell may be consistent with the legacy subframe. For example, if the discovery reference signal is the PSS/SSS, the first subframe may be subframes 0 and/or 5 as discussed above. In another embodiment, the first subframe may be any other suitable subframe in the DRS occasion for the purpose of more flexibility.

According to embodiments of the subject matter described herein, the second subframe for transmission of a discovery reference signal from a deactivated small cell may be any suitable subframe in the DRS occasion that is separated from the first subframe for transmission of a discovery reference signal from an activated small cell such that the discovery reference signals may be transmitted with less conflicts and/or interferences.

After the first and second subframes are configured, the macro BS 210 may need to inform the configuration to other devices in the system 200, such as the small BS 220, the UE 100 and the like, such that these devices may use the configuration for the transmission and/or reception of the discovery reference signals. In one embodiment, the subframe configuration may be indicated in a bitmap. For example, for the configuration of the first or second subframe, a bitmap may be generated with the length of the number of subframes included in the DRS occasion. In the bitmap, it is possible to use "1" to indicate the usage of the corresponding subframe and use "0" to indicate non-usage of the corresponding subframe, and vice versa. In another embodiment, the subframe configuration may be indicated directly by the subframe indexes associated with used subframes.

In order to facilitate implementation, in one embodiment, the at least one second subframe may be configured as at least one consecutive subframe in the DRS occasion separated from the at least first subframe. In this embodiment, instead of the bitmap or subframe indexes as discussed above, the macro BS 210 may inform of the small BS 210 or UE 100 a value K indicating the number of the consecutive subframes and an offset of the consecutive subframes in the occasion.

Generally, the UE performs cell discovery and cell measurement in the DRS occasion. Considering the accuracy of the subsequent measurement related to the discovery reference signal at the UE 100, such as the measurement of the RSRP, in one embodiment, the at least one consecutive subframe as the second subframe may be configured at the beginning of the DRS occasion. The configuration of the consecutive subframes at the beginning of the DRS occasion includes the two following configurations:
(1) the second subframe is configured as the first one or more subframes in the occasion, and the first subframe is configured as one or more subsequent subframes in the occasion;
(2) the first subframe is configured as the first one or more subframes in the occasion, and the second subframe is configured as one or more subframes immediately follows the first subframe. In this way, upon the detection of the discovery reference signal, the UE 100 may have more time to perform the measurement.

Figure 5:
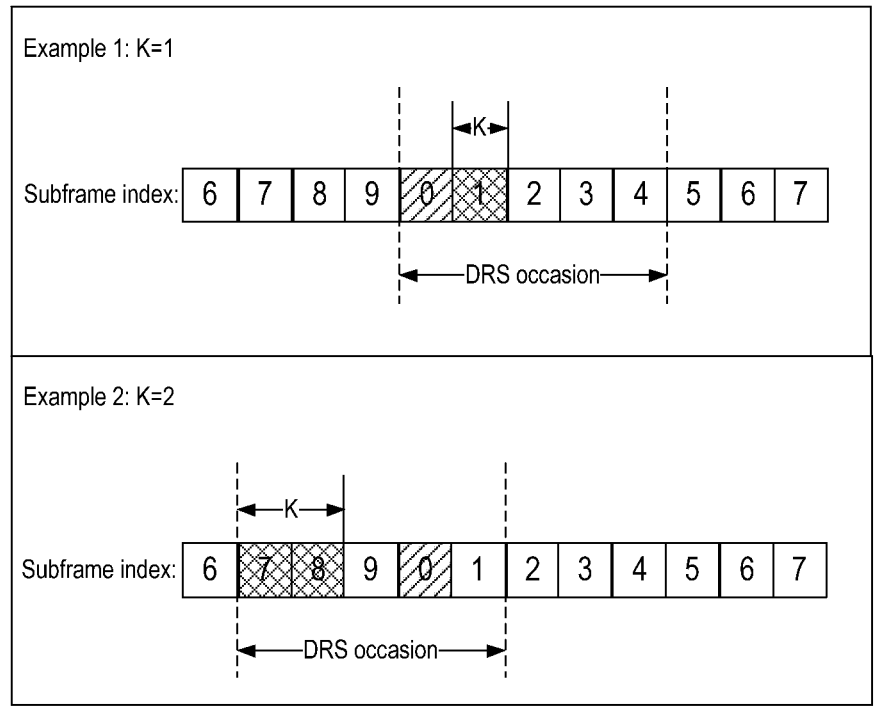
FIG. 5 illustrates two example frame structures of a DRS occasion in accordance with one embodiment of the subject matter described herein.

FIG. 5 illustrates two example frame structures of a DRS occasion in accordance with one embodiment of the subject matter described herein. As shown in FIG. 5, subframe 0 in the example DRS occasions is configured as the first subframe for the transmission of the discovery reference signal from an activated small cell. In Example 1, the DRS occasion comprises the subframes of 0 to 4. That is, the first one of the subframes comprised in the occasion, i.e., subframe 0, is configured as the subframe for the transmission of the discovery reference signal from an activated small cell. The immediately subsequent K (K=1 in Example 1) subframes are configured as the subframe for the transmission of the discovery reference signal from a deactivated small cell. In Example 2, the DRS occasion comprises the subframes of 7 to 1. The first K (K=2 in Example 2) ones of the subframes comprised in the occasion are configured as the subframes for the transmission of the discovery reference signal from a deactivated small cell. Since the subframes for the transmission of the discovery reference signal from a deactivated small cell is configured as the consecutive subframes at the beginning of the occasion, only the value K indicating the number of the subframes may be transmitted from the macro BS 210, for example, to the small BS 220 or the UE 100, and the offset of the consecutive subframes in the occasion may be omitted such that the system overheads may be further reduced.

Still with reference to FIG. 4, the method 400 proceeds to step 430, where the macro BS 210 configures the at least one first subframe to be used by a TP 230 to transmit a discovery reference signal. As discussed above, a TP 230, whether it is activated or deactivated, may also need to transmit a discovery reference signal to the UE 100 such that the UE 100 may discover it. It is to be understood that step 430 is optional. For example, in one embodiment, the TP 230 may be configured to use any other suitable subframe in the DRS occasion to transmit the discovery reference signal.

As discussed above, the CRS, which uniquely corresponds to identification information of a cell, such as a cell ID, is typically used for the cell measurement, such as the measurement of the RSRP. However, for a TP, the UE may not use the CRS to discriminate the TP from other TPs, and accurately measure the RSRP, because a plurality of TPs are generally configured with one cell ID.

In the environment comprising a plurality of small cells and TPs within a macro cell as shown in FIG. 2, if a small BS 220 and a TP 230 concurrently transmits a discovery reference signal to the UE 100, it is beneficial for the UE 100 to know whether the discovery reference signal is received from a small cell or a TP 230. In one embodiment, the macro BS 210 may transmit identification information of a TP, for example the cell ID of this TP, to the UE 100. This identification information may be shared among a plurality of TPs, or specific to the TP. Thus, the UE 100 may know that a discovery reference signal is transmitted by a TP, but not a small cell. Then, the UE 100 may choose to use the CSI-RS instead of the CRS to perform the measurement of the RSRP. In this way, the UE 100 may obtain a more accurate measurement of the RSRP for a TP 230. It is to be understood that the identification procedure of a TP and the subsequent measurement of the RSRP as discussed above may also be implemented independent of the method for configuring the DRS occasion in accordance with embodiments of the subject matter described herein.

Figure 6:
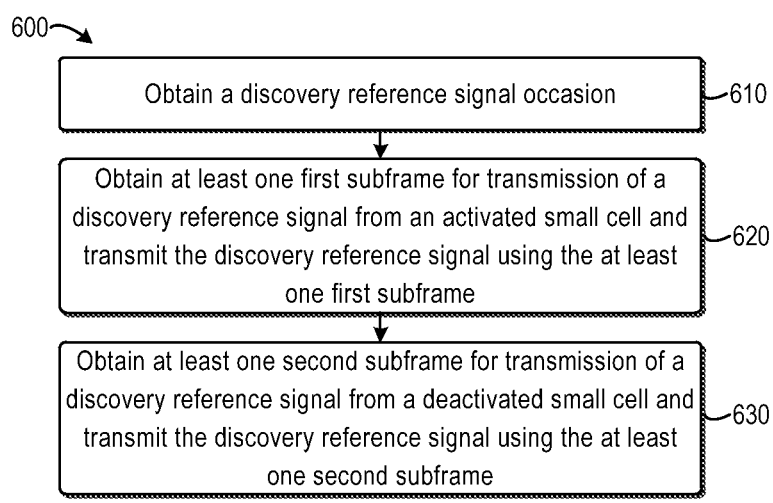
FIG. 6 illustrates the flowchart of a method for transmitting a discovery reference signal based on the DRS occasion configuration at a small BS in accordance with one embodiment of the subject matter described herein.

FIG. 6 shows the flowchart of a method 600 for transmitting a discovery reference signal based on the DRS occasion configuration at a small BS in accordance with one embodiment of the subject matter described herein. The method 600 may be at least in part implemented by a small BS 220.

The method 600 is entered at step 610, where the small BS 220 obtains the DRS occasion comprising a plurality of consecutive subframes. As discussed above, the duration of the occasion, e.g., the number of the subframes in the occasion, and the beginning subframe of the occasion may be set flexibly according to practical needs.

Then, the method 600 proceeds to step 620, where the small BS 220, in response to its own the small cell activated, obtains at least one first subframe of the occasion and transmits a discovery reference signal using at least one first subframe, wherein the at least one first subframe is configured for transmission of a discovery reference signal from an activated small cell. Next, at step 630, in response to the small cell deactivated, the small BS 220 obtains at least one second subframe of the occasion and transmits the discovery reference signal using the at least one second subframe, wherein the at least one second subframe is different from the at least one first subframe, and is configured for transmission of the discovery reference signal from a deactivated small cell. In this way, the transmission of the discovery reference signal from the small cells may be separated based on the activated or deactivated states of the small cells such that conflicts and/or interferences may be reduced.

As discussed above, the configuring of the DRS occasion and/or the first and second subframes thereof may be performed by the macro BS 210. The operations of the macro BS 210 have been described with reference to FIGS. 4 and 5. In this case, the small BS 220 may obtain configuration information from the macro BS 210, for example, though an interface X2. It is to be understood that the configuring may be performed by any other suitable device. For example, in one embodiment, the DRS occasion and/or the first and second subframes thereof may be configured by a network control element, such as a Radio Network Controller (RNC)

(not shown), and then transmitted from the RNC to the small BS 220 via the macro BS 210.

Alternatively or additionally, the small BS 220 may perform more operations on the configuring of the DRS occasion and/or the first and second subframes thereof. For example, the small BS 220 may determine a configuration, and inform the determined configuration to the macro BS 210. Then, the macro BS 210 or the RNC may decide whether the configuration is acceptable, or decide a common configuration based on the determined configurations from a plurality of the small BSs 220.

As discussed above, the first subframe for transmission of a discovery reference signal from an activated small cell may be consistent with the legacy subframe, or may be any suitable subframe in the occasion. The second subframe for transmission of a discovery reference signal from a deactivated small cell may be any suitable subframe that is separated from the first subframe. The configuration of the first and/or second subframes may be indicated in a bitmap or directly by the subframe indexes associated with used subframes.

As discussed above, in order to facilitate implementation, the at least one second subframe may be at least one consecutive subframe in the DRS occasion separated from the at least first subframe. In this case, instead of the bitmap or subframe indexes as discussed above, the small BS 220 may receive from the macro BS 210 a value K indicating the number of the consecutive subframes and an offset of the consecutive subframes in the occasion. More specifically, in order to ensure more time for the UE 100 to perform the subsequent measurement of the RSRP, and thereby improve the accuracy of the measurement, the at least one consecutive subframe may be configured at the beginning of the DRS occasion. Accordingly, the small BS 220 may receive only the value K indicating the number of the consecutive subframes without the offset of the consecutive subframes in the occasion. Then, the small BS 220 may obtain the subframes for transmission of a discovery reference signal from a deactivated small cell based on the number.

In one embodiment, at step 620 and/or 630, before transmitting the discovery reference signal, the small BS 220 may select a subframe from the at least one first subframe in response to its own small cell activated, and/or select a subframe from the at least one second subframe in response to the small cell deactivated. As discussed above, the number of the first or second subframe may be one or more. If there is only one first or second subframe in the DRS occasion, the only one first or second subframe may be directly selected for transmitting the discovery reference signal in response to the small cell activated or deactivated. If the number of the first or second subframes is two or more, the small BS 220 may select one of the subframes for example based on the following formula:

(cell ID)mod(*N*), wherein the cell ID represents the cell ID of the small cell of the small BS 220, and N represents the number of the configured first or second subframes.

Figure 7:
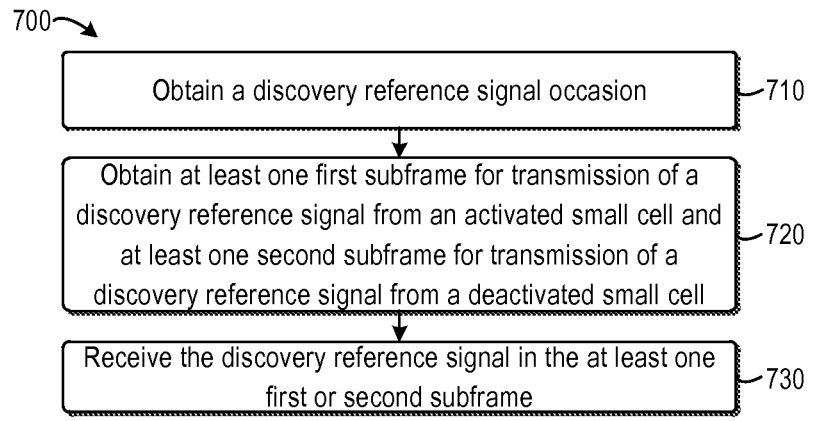
FIG. 7 illustrates the flowchart of a method for receiving a discovery reference signal based on a DRS occasion configuration at the UE side in accordance with one embodiment of the subject matter described herein.

FIG. 7 shows the flowchart of a method 700 for receiving a discovery reference signal based on a DRS occasion configuration at the UE side in accordance with one embodiment of the subject matter described herein. The method 700 may be at least in part implemented by the UE 100.

The method 700 is entered at step 710, where the UE 100 obtains the DRS occasion comprising a plurality of consecutive subframes. Then, at step 720, the UE 100 obtains at least one first and second subframes of the occasion, wherein the at least one first subframe is configured for transmission of a discovery reference signal from an activated small cell, and the at least one second subframe, which is different from the at least one first subframe, is configured for transmission of the discovery reference signal from a deactivated small cell.

As discussed above, the configuring of the DRS occasion and/or the first and second subframes thereof may be performed by the macro BS 210, the small BS 220, or any other suitable device, such as a RNC (not shown). After the configuration is determined, the UE 100 may obtain the configuration from any suitable device that may communicate with the UE 100, including, but not limited to, the macro BS 210, the small BS 220, the TP 230 and the like, through, for example, a higher layer signaling, such as a Radio Resource Control (RRC) signalling.

As discussed above, the duration of the DSR occasion, e.g., the number of the subframes in the occasion, and the beginning subframe of the occasion may be set flexibly according to practical needs. The number of the at least one first or second subframe may be one or more.

As discussed above, the first subframe for transmission of a discovery reference signal from an activated small cell may be consistent with the legacy subframe, or may be any suitable subframe in the DRS occasion. The second subframe for transmission of a discovery reference signal from a deactivated small cell may be any suitable subframe that is separated from the first subframe. The configuration of the first and second subframes may be indicated in a bitmap or directly by the subframe indexes associated with used subframes.

As discussed above, in order to facilitate implementation, the at least one second subframe may be at least one consecutive subframe in the DSR occasion separated from the at least first subframe. In this case, instead of the bitmap or subframe indexes as discussed above, the UE 100 may receive from the macro BS 210 or the small BS 220 a value K indicating the number of the consecutive subframes and an offset of the consecutive subframes in the occasion. More specifically, in order to ensure more time for the UE 100 to perform the subsequent measurement of the RSRP, and thereby improve the accuracy of the measurement, the at least one consecutive subframe may be configured at the beginning of the DRS occasion. Accordingly, the UE 100 may receive only the value K indicating the number of the consecutive subframes without the offset of the consecutive subframes.

Still with reference to FIG. 7, the method 700 proceeds to step 730, where the UE 100 receives the discovery reference signal in the at least one first or second subframe. In this way, the transmission of the discovery reference signals from the small cells may be performed separately based on the activated or deactivated states of the small cells with low conflicts and/or interferences. As a result, the UE 100 may determine the state of the small cell from which the discovery reference signal is received based on the subframe in which the discovery reference signal is received.

As discussed above, the CRS is often transmitted from a cell to the UE for the cell measurement, such as the measurement of the RSRP. As proposed, the BS of an activated small cell transmits the CRS in each time instant, for example, in each subframe; the BS of a deactivated small cell transmits the CRS only in the DRS occasion. In order to achieve a more accurate measurement, in one embodiment, the UE 100 may extend the duration of performing the measurement on an activated small cell until a specific subframe after the end of the DSR occasion. That is, the UE 100 may measure the RSRP during a period of time from the subframe in which a discovery reference signal is received to a specific subframe after the end of the occasion. The specific subframe may be determined according to the practical needs. In this embodiment, for a deactivated small cell, the UE 100 may measure the RSRP during a period of time from the subframe in which a discovery reference signal is received to the end of the occasion.

As discussed above, in one embodiment, the first subframe of the DRS occasion for transmission of a discovery reference signal from an activated small cell may be also configured to be used by a TP 230, whether it is activated or deactivated, to transmit a discovery reference signal. In this embodiment, the UE 100 may not need to discriminate the activated or deactivated state of the TP 230, and may measure the RSRP of the TP 230 during a period of time from the subframe in which a discovery reference signal is received to the end of the occasion.

As discussed above, for a TP 230, the UE 100 may not use the CRS to measure the RSRP because the CRSs of a plurality of TPs 230 are the same. As a result, in the environment comprising a plurality of small cells and TPs within a macro cell as shown in FIG. 2, it is beneficial for the UE 100 to know whether the discovery reference signal is received from a small cell or a TP 230. In one embodiment, the UE 100 may receive identification information of a TP from macro BS 210. This identification information may be shared among a plurality of TPs, or specific to the TP. In this way, the UE 100 may know that a discovery reference signal is transmitted by a TP, but not a small cell. Then, the UE 100 may choose to use the CSI-RS instead of the CRS to perform the measurement of the RSRP.

Figure 8:
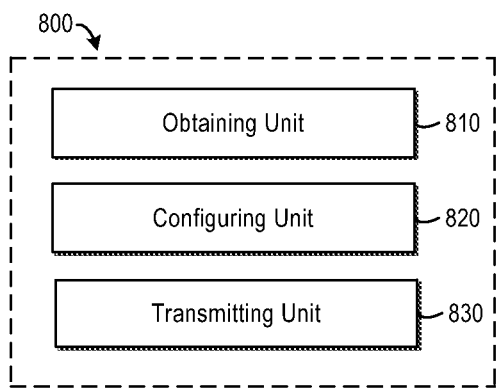
FIG. 8 illustrates a block diagram of an apparatus for configuring a DRS occasion implemented at least in part by a macro BS in accordance with one embodiment of the subject matter described herein.

FIG. 8 shows a block diagram of an apparatus 800 for configuring a DRS occasion implemented at least in part by a macro BS in accordance with one embodiment of the subject matter described herein. As shown, the apparatus 800 comprises an obtaining unit 810 configured to obtain a DRS occasion comprising a plurality of consecutive subframes; a configuring unit 820 configured to configure at least one first subframe of the occasion for transmission of a discovery reference signal from an activated small cell, and configure at least one second subframe of the occasion for transmission of a discovery reference signal from a deactivated small cell, the at least one second subframe being different from the at least one first subframe.

In one embodiment, the configuring unit 820 may be further configured to configure at least one consecutive second subframe of the occasion for the transmission of a discovery reference signal from the deactivated small cell. In one embodiment, the configuring unit 820 may be further configured to configure the at least one consecutive second subframe at the beginning of the occasion.

In one embodiment, the apparatus 800 may further comprise a transmitting unit 830 configured to transmit the number of the at least one consecutive second subframe.

In one embodiment, the configuring unit 820 may be further configured to configure the at least one first subframe of the occasion for transmission of a discovery reference signal from a TP 230.

In one embodiment, the transmitting unit 830 may be configured to transmit identification information of the TP 230 to a UE 100 such that the UE 100 determines that the discovery reference signal is received from a TP 230 but not from a small cell based on the identification information.

Figure 9:
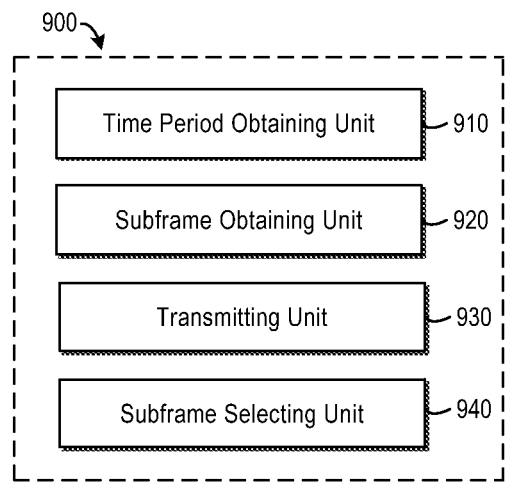
FIG. 9 illustrates a block diagram of an apparatus for transmitting a discovery reference signal based on a DRS occasion configuration implemented at least in part by a small BS in accordance with embodiments of the subject matter described herein.

FIG. 9 shows a block diagram of an apparatus 900 for transmitting a discovery reference signal based on a DRS occasion configuration implemented at least in part by a small BS in accordance with embodiments of the subject matter described herein. As shown, the apparatus 900 comprises a time period obtaining unit 910 configured to obtain the DRS occasion comprising a plurality of consecutive subframes; a subframe obtaining unit 920 configured to obtain at least one first subframe of the occasion in response to the small cell of the small BS activated, and obtain at least one second subframe of the occasion in response to being deactivated, the at least one first subframe configured for transmission of a discovery reference signal from an activated small cell, and the at least one second subframe configured for transmission of the discovery reference signal from a deactivated small cell, the at least one first subframe different from the at least one second subframe; and a transmitting unit 930 configured to transmit a discovery reference signal using the at least one first subframe in response to the small cell activated, and transmit the discovery reference signal using the at least one second subframe in response to the small cell deactivated.

In one embodiment, the apparatus 900 may comprise a subframe selecting unit 940 configured to select a second subframe from the at least one second subframe in response to the small cell activated. In this embodiment, the transmitting unit 930 may be further configured to transmit the discovery reference signal in the selected second subframe in response to the small cell activated.

In one embodiment, the subframe selecting unit 940 may be further configured to select a second subframe based on the number of the at least one second subframe and an identifier of the small cell.

In one embodiment, the at least one second subframe may be consecutive. In one embodiment, the at least one consecutive second subframe may be configured at the beginning of the DRS occasion In one embodiment, the apparatus 900 may further comprise a receiving unit 950 configured to receive an indicator of the number of the at least one consecutive second subframe. In this embodiment, the subframe obtaining unit 920 may be configured to obtain the at least one consecutive second subframe based on the number.

Figure 10:
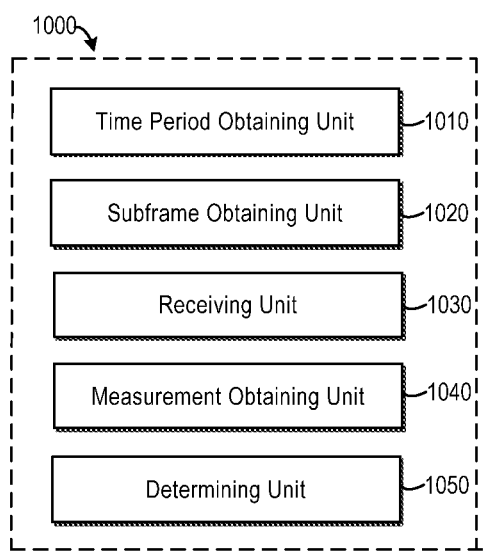
FIG. 10 illustrates a block diagram of an apparatus for receiving a discovery reference signal based on a DRS occasion configuration implemented at least in part by a UE in accordance with embodiments of the subject matter described herein.

FIG. 10 shows a block diagram of an apparatus 1000 for receiving a discovery reference signal based on a DRS occasion configuration implemented at least in part by a UE in accordance with embodiments of the subject matter described herein. As shown, the apparatus 1000 comprises a time period obtaining unit 1010 configured to obtain the DRS occasion comprising a plurality of consecutive subframes; a subframe obtaining unit 1020 configured to obtain at least one first subframe of the occasion and at least one second subframe of the occasion, the at least one first subframe configured for transmission of a discovery reference signal from an activated small cell, and the at least one second subframe configured for transmission of the discovery reference signal from a deactivated small cell, the at least one first subframe different from the at least one second subframe; and a receiving unit 1030 configured to receive the discovery reference signal in the at least one first or second subframe.

In one embodiment, the at least one second subframe may be consecutive. In one embodiment, the at least one consecutive second subframe is configured at the beginning of the DRS occasion.

In one embodiment, the receiving unit 1030 may be further configured to receive an indicator of the number of the at least one second subframe. In this embodiment, the subframe obtaining unit 1020 may be further configured to obtain the at least one consecutive second subframe based on the number.

In one embodiment, the apparatus 1000 may further comprise a measurement obtaining unit 1040 configured to, in response to the discovery reference signal received in one of the at least one first subframe and received from a small cell, obtain a measurement of a reference signal received power during a first period of time from the one of the at least one first subframe to a specific subframe after the end of the occasion; and, in response to the discovery reference signal received in one of the at least one second subframe, obtain the measurement during a second period of time from the one of the at least one second subframe to the end of the occasion.

In one embodiment, the discovery reference signal may be a synchronization signal. In this embodiment, the measurement obtaining unit 1040 may be further configured to in response to the synchronization signal received from the TP 230, obtain the measurement based on a CSI-RS; and, in response to the synchronization signal not received from the TP 230, obtain the measurement based on at least one of the CSI-RS and a CRS.

In one embodiment, the at least one first subframe may be further configured for transmission of a discovery reference signal from a TP 230. In this embodiment, the measurement obtaining unit 1040 may be further configured to, in response to the discovery reference signal received from the TP 230, obtain the measurement during a third period of time from a third subframe to the end of the occasion, the discovery reference signal received in the third subframe.

In one embodiment, the receiving unit 1030 may be further configured to receive identification information of a TP 230. In this embodiment, the apparatus 1000 may further comprise a determining unit 1050 configured to determine that the discovery reference signal is received from a TP 230 but not from a small cell based on the identification information.

The units included in the apparatuses 800, 900 and/or 1000 may be implemented in various manners, including software, hardware, firmware, or any combination thereof. In one embodiment, one or more units may be implemented using software and/or firmware, for example, machine-executable instructions stored on the storage medium. In addition to or instead of machine-executable instructions, parts or all of the units in the apparatuses 800, 900 and/or 1000 may be implemented, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Generally, various embodiments of the subject matter described herein may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the subject matter described herein are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

By way of example, embodiments of the subject matter can be described in the general context of machine-executable instructions, such as those included in program modules, being executed in a device on a target real or virtual processor. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the subject matter described herein may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the subject matter has been described in language specific to structural features and/or methodological acts, it is to be understood that the subject matter defined in the appended claims is not necessarily limited to the specific features or acts discussed above. Rather, the specific features and acts discussed above are disclosed as example forms of implementing the claims.

We claim:

1. A method implemented by a base station of a macro cell, comprising:
   obtaining a time period for transmission of a discovery reference signal, the time period comprising a plurality of consecutive subframes;
   configuring at least one first subframe of the time period for transmission of discovery reference signals from a plurality of activated small cells of a plurality of small cells;
   configuring at least one second subframe of the time period for transmission of discovery reference signals from a plurality of deactivated small cells of the plurality of small cells, wherein the at least one second subframe is different from and does not overlap with the at least one first subframe, and wherein the discovery reference signals from the plurality of activated small cells are only transmitted in the at least one first subframe and the discovery reference signals from the plurality of deactivated small cells are only transmitted in the at least one second subframe to reduce interference between the plurality of small cells in the transmission of discovery reference signals; and
   informing the configuration to the plurality of small cells for use in transmission of the discovery reference signals.

2. The method according to claim 1, wherein configuring the at least one second subframe of the time period comprises:
   configuring one second subframe of the time period or configuring a plurality of consecutive second subframes of the time period.

3. The method according to claim 2, wherein configuring the plurality of consecutive second subframes of the time period comprises:
   configuring the at least one second subframe at a beginning of the time period.

4. The method according to claim 2, further comprising:
   transmitting a number of the plurality of consecutive second subframes to user equipment.

5. The method according to claim 1, further comprising:
   configuring the at least one first subframe of the time period for transmission of the discovery reference signals from a plurality of transmission points.

6. The method according to claim 5, further comprising:
   transmitting identification information of the plurality of transmission points to user equipment, such that the user equipment determines that the discovery reference signals are received from the plurality of transmission points but not from a plurality of small cells based on the identification information.

7. The method of claim 1, wherein user equipment is informed as to whether each small cell is activated or deactivated based on whether the small cell transmits during the at least one first subframe or the at least one second subframe.

8. A method implemented by a base station in each of a plurality of small cells, comprising:
   receiving a configuration for transmission of a discovery reference signal, the configuration indicating a plurality of consecutive subframes of a time period, wherein at least one first subframe of the time period is allocated for transmission of the discovery reference signal when the plurality of small cells are activated and at least one second subframe is allocated for transmission of the discovery reference signal when the plurality of small cells are deactivated, wherein the at least one second subframe is different from and does not overlap with the at least one first subframe;
   in response to the plurality of small cells being activated, transmitting the discovery reference signal using only the at least one first subframe; and
   in response to the plurality of small cells being deactivated, transmitting the discovery reference signal using only the at least one second subframe, wherein interference between the plurality of small cells in the transmission of discovery reference signals is reduced.

9. The method according to claim 8, wherein transmitting the discovery reference signal using only the at least one second subframe comprises:
   selecting a second subframe from the at least one second subframe; and
   transmitting the discovery reference signal in the selected second subframe.

10. The method according to claim 9, wherein selecting the second subframe from the at least one second subframe comprises:
    selecting the second subframe from the at least one second subframe based on a number of the at least one second subframe and a small cell identifier.

11. The method according to claim 8, wherein the at least one second subframe comprises one second subframe or a plurality of consecutive second subframes.

12. The method according to claim 8, wherein the at least one second subframe or a plurality of consecutive second subframes is configured at a beginning of the time period.

13. The method according to claim 12, further comprising:
    receiving an indicator of a number of the plurality of consecutive second subframes, and
    wherein transmitting the discovery reference signal using only the plurality of consecutive second subframes comprises:
      transmitting the discovery reference signal using only the plurality of consecutive second subframes based on the number of the plurality of consecutive second subframes.

14. User equipment, comprising:
    a receiver;
    a controller coupled to the receiver; and
    a memory in communication with the controller, the memory including instructions which, when executed, cause the controller to control the user equipment to:
      receive a configuration for transmission of a discovery reference signal from a plurality of small cells, the configuration indicating a plurality of consecutive subframes of a time period, wherein at least one first subframe of the time period is allocated for transmission of the discovery reference signal when the plurality of small cells are activated and at least one second subframe is allocated for transmission of the discovery reference signal when the plurality of small cells are deactivated, wherein the at least one first subframe is different from and does not overlap with the at least one second subframe, and wherein discovery reference signals from the plurality of small cells are transmitted only in the at least one first subframe when the plurality of small cells are activated and the discovery reference signals from the plurality of small cells are transmitted only in the at least one second subframe when the plurality of small cells are deactivated; and receive the discovery reference signal from the plurality of small cells in the at least one first subframe or the at least one second subframe, and determine if the plurality of small cells are activated or deactivated based on whether the discovery reference signal is received in the at least one first subframe or the at least one second subframe.

15. The user equipment according to claim 14, wherein the at least one second subframe is one second subframe or a plurality of consecutive second subframes.

16. The user equipment according to claim 15, wherein the plurality of consecutive second subframes is configured at a beginning of the time period.

17. The user equipment according to claim 16, wherein the instructions further cause the controller to control the user equipment to:

receive an indicator of a number of the plurality of consecutive second subframes, and receive the discovery reference signal from a first cell of the plurality of small cells in the plurality of consecutive second subframes based on the number.

18. The user equipment according to claim 14, wherein the instructions further cause the controller to control the user equipment to:

in response to the discovery reference signal received in the at least one first subframe, obtain a measurement of a reference signal received power during a first period of time from the at least one first subframe to a third subframe after an end of the time period; and in response to the discovery reference signal received in the at least one second subframe, obtain the measurement during a second period of time from the at least one second subframe to the end of the time period.

19. The user equipment according to claim 14, wherein the at least one first subframe is further configured for transmission of a second discovery reference signal from a transmission point, and wherein the instructions further cause the controller to control the user equipment to:

receive identification information from the transmission point; and determine that the second discovery reference signal is received from the transmission point but not from a small cell based on the identification information.

20. The user equipment of claim 14, wherein the user equipment identifies each small cell as activated or deactivated based on whether the small cell transmits during the first subframe or the second subframe.

* * * * *